United States Patent
Sachtjen et al.

(10) Patent No.: US 7,801,961 B2
(45) Date of Patent: Sep. 21, 2010

(54) E-MAIL MESSAGE AUTHENTICATION AND MARKING EXTENDING STANDARDS COMPLAINT TECHNIQUES

(75) Inventors: Scott A Sachtjen, San Jose, CA (US); Vlad Adrian Hociota, Bucharest (RO); Razvan Vlad Lazar, Bucharest (RO); Serban Adrian Tir, Bucharest (RO)

(73) Assignee: Iconix, Inc., Santa Clara, CA (US)

( * ) Notice: Subject to any disclaimer, the term of this patent is extended or adjusted under 35 U.S.C. 154(b) by 150 days.

(21) Appl. No.: 12/118,547

(22) Filed: May 9, 2008

(65) Prior Publication Data

US 2009/0282108 A1 Nov. 12, 2009

(51) Int. Cl.
G06F 15/16 (2006.01)
G06F 7/04 (2006.01)

(52) U.S. Cl. .............................. 709/206; 726/4; 726/28; 726/29

(58) Field of Classification Search .................. 709/206; 726/4, 5, 28–30
See application file for complete search history.

(56) References Cited

U.S. PATENT DOCUMENTS

| 7,072,944 B2 * | 7/2006 | Lalonde et al. ............. 709/206 |
| 2004/0024823 A1 * | 2/2004 | Del Monte .................. 709/206 |
| 2004/0068542 A1 * | 4/2004 | Lalonde et al. ............. 709/206 |
| 2004/0193924 A1 * | 9/2004 | Kira et al. ................... 713/201 |
| 2005/0203985 A1 | 9/2005 | Faynberg et al. |
| 2006/0179157 A1 * | 8/2006 | Huang ........................ 709/238 |
| 2006/0277597 A1 * | 12/2006 | Dreymann .................... 726/4 |
| 2008/0005786 A1 * | 1/2008 | Dreymann .................... 726/4 |
| 2008/0189770 A1 * | 8/2008 | Sachtjen ....................... 726/4 |

FOREIGN PATENT DOCUMENTS

| JP | 2004064215 | 2/2004 |
| JP | 2007028667 | 2/2007 |
| JP | 2007074498 | 3/2007 |

* cited by examiner

Primary Examiner—Philip J Chea

(57) ABSTRACT

A system and method for e-mail authentication. The method includes aggregating a plurality of headers associated with an e-mail message and transmitting the aggregated plurality of headers to a validation service. A validation response is then received from the validation service. The e-mail is authenticated based on the validation response.

18 Claims, 7 Drawing Sheets

US 7,801,961 B2

E-MAIL MESSAGE AUTHENTICATION AND MARKING EXTENDING STANDARDS COMPLAINT TECHNIQUES

FIELD OF THE INVENTION

Embodiments of the present invention are generally related to authenticating e-mail messages.

BACKGROUND OF THE INVENTION

As e-mail use has become increasingly widespread, e-mail has increasingly been used to communicate important information, such as, information regarding financial transactions. For example, a user may be informed via e-mail that a bank transaction has occurred. The user will want to know or trust that the e-mail was sent by the bank and therefore that the contents can be trusted. A similar situation exists where an e-mail is sent by a third party, such as on the behalf of another user. For example, an electronic payment system may send an e-mail on behalf of a buyer to a seller. The seller needs to be able to trust the e-mail is from the electronic payment system and can proceed with the sale.

A number of technologies, such as SPF (sender policy framework; RFC 4408), Sender ID (sender identification, RFC 4406), PRA (purported responsible address; RFC 4407), DomainKeys, and Domainkeys identified mail (RFC 4871), have been developed to help verify e-mail exchanged between servers or MTAs (mail transfer agents). Generally, these technologies are used to help ensure that the identifying information included in an e-mail's headers correlates with the sending MTA. However, these technologies do not address the problem of legitimate yet fraudulent senders. For example, an e-mail sent from Your0nlineBank.com (with the number "0") may comply with all of the necessary standards, but a user receiving that e-mail may easily confuse it for a legitimate e-mail from YourOnlineBank.com (with the letter "O"). Another example, e-mail headers may be spoofed to make it look like the e-mail came from a bank server such as customersupport56@yourbank.com which is not authorized to send e-mail or may not exist.

The existing standards are set up to prevent fraudulent e-mail from reaching an end user. More specifically, the standards executed by e-mail servers. However, the current standards do not protect the user from fraudulent e-mail with seemingly correct, but misleading, header information. Further, the current standards do not test for authenticity or trustworthiness and do not provide the user with any indication that an e-mail is authentic and trustworthy.

SUMMARY OF THE INVENTION

Embodiments of the present invention authenticate and indicate that an e-mail is trustworthy thereby allowing users to trust the contents of the e-mail. Embodiments of the present invention advantageously utilize standards compliant authentication, among other techniques, to confidence mark e-mails. Advantageously, embodiments analyze the "from:" header prior to other headers because the FROM is actually presented by the mail user agent (MUA) to the user.

In one embodiment, the present invention is implemented as a method for authenticating an e-mail message. The method includes aggregating a plurality of headers associated with an e-mail message and transmitting the aggregated plurality of headers to a validation service. A validation response is received from the validation service including registered senders and associated instructions. The e-mail may then be authenticated based on the validation response using variety of customized and standards compliant techniques.

In another embodiment, the present invention is implemented as a system for authenticating an e-mail message. The system includes an e-mail header module for extracting headers from an e-mail message and a communications module for sending the e-mail headers extracted by the e-mail header module. The communications module further receives a validation response comprising one or more e-mail addresses and corresponding instructions. The e-mail addresses and the corresponding instructions can then be used by an authentication module for authenticating the e-mail message.

In another embodiment, the present invention is implemented in as a method for authenticating an e-mail message. The method includes extracting a plurality of addresses from a plurality of e-mail headers associated with the e-mail message. The extracted plurality of addresses may be sent for validation. In response, a validated address and associated instructions may be received. The validated address can then be compared against a "From:" header. If the validated address matches the "From:" header, the e-mail may be authenticated (e.g., via a custom SPF process). If there is a mismatch between the validated address and the "From:" header, a purported responsible authority (PRA) may be extracted and used to authenticate the e-mail.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
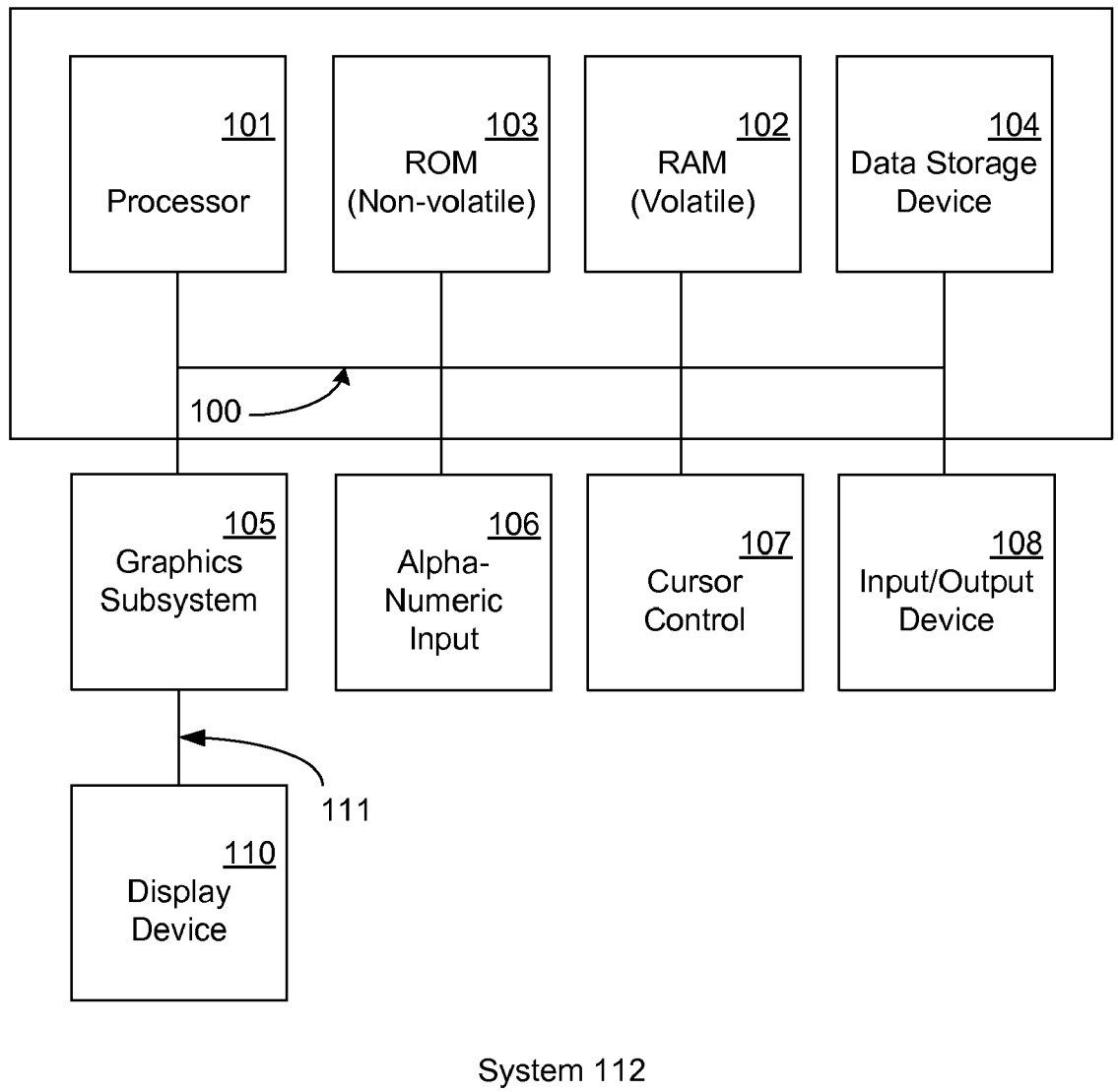
FIG. 1 is a block diagram of an exemplary computer system upon which embodiments of the present invention may be implemented.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System:

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

E-mail Authentication:

Embodiments of the present invention advantageously utilize standards compliant authentication, among other techniques, to confidence mark e-mails. Embodiments of the present invention may further perform authentication and confidence marking on a client (e.g., Mail user agent (MUA)). Advantageously, embodiments analyze the "from:" header prior to other headers because the FROM is actually presented by the mail user agent (MUA) to the user. Embodiments further support authentication of $1^{st}$ and $3^{rd}$ party e-mails where the "from:", a $1^{st}$ party e-mail, is not a registered sender but the PRA, a $3^{rd}$ party e-mail, is a registered sender and therefore may be authenticated.

Figure 2:
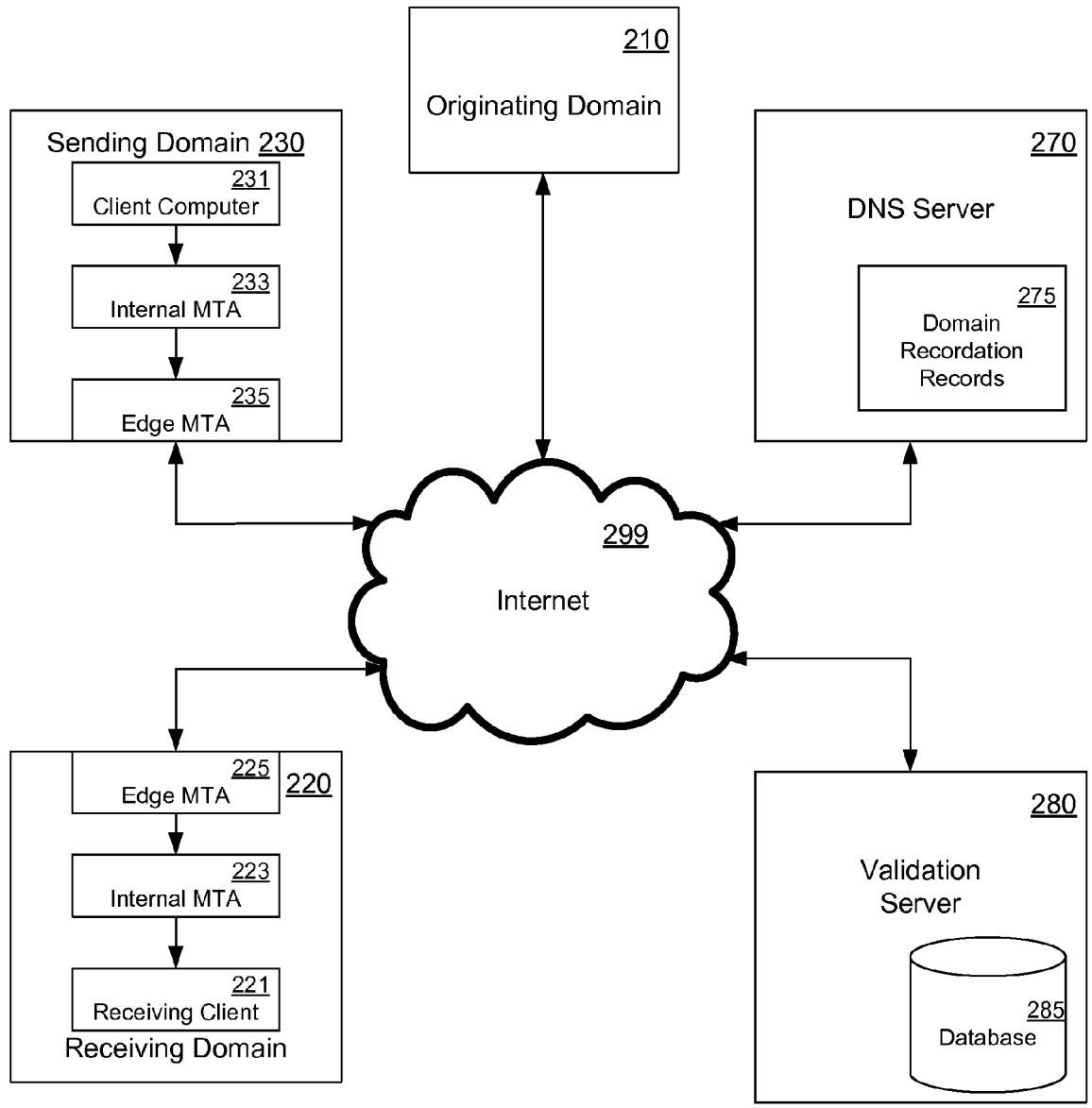
FIG. 2 is a block diagram of an exemplary networking environment, in accordance with one embodiment.

With reference now to FIG. 2, an exemplary networking environment 200 is depicted, in accordance with one embodiment. While network 200 is depicted as incorporating specific, enumerated features and elements, it is understood that embodiments are well suited to applications involving additional, fewer, or different features, elements, or arrangements.

Network 200, as depicted in FIG. 2, is representative of the transactions which may occur during transmission and authentication of a third-party e-mail, in one embodiment. For example, a user within originating domain 210 may engage in some e-commerce transaction with a user within receiving domain 220. As a result of this transaction, a third-party sender within sending domain 230 may use client computer 231 to send an e-mail. The e-mail may pass through one or more internal MTAs 233 within the sending domain 230, before it reaches edge MTA 235. The e-mail leaves sending domain 230 at edge MTA 235, and passes through Internet 299 before reaching receiving domain 220. The e-mail enters receiving domain 220 via edge MTA 225, and may pass through one or more internal MTAs 223 before reaching receiving client 221. It is appreciated that network 200 is also representative of transactions which may occur during transmission and authentication of a first-party e-mail originating from client computer 231 with a destination of receiving client 221.

In some embodiments, once the e-mail is received, software on receiving client 221 attempts to authenticate the e-mail. Portions of the e-mail, e.g., selected portions of the e-mail headers, are passed to validation service 280, which includes database 285. In several such embodiments, validation service 280 provides a validation response including registered senders and associated instructions. It is appreciated the server 280 could also carry out authentication. Receiving Client 221 may access DNS server 270 while attempting to authenticate the e-mail, and retrieves domain recordation records 275. Receiving client 221 may utilize a variety of authentication techniques including, but not limited to, a custom SPF process as described herein, SenderID using PRA, or MFROM, DK, and DKIM.

Figure 3:
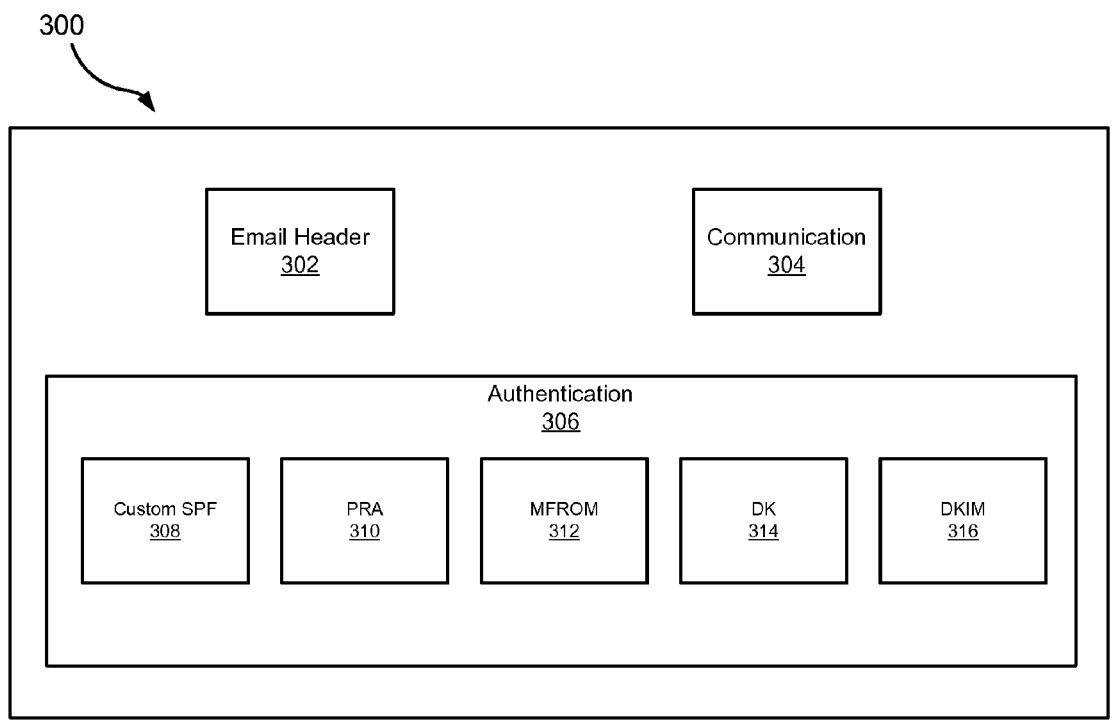
FIG. 3 is a block diagram of a system for authenticating an e-mail message, in accordance with one embodiment.

FIG. 3 illustrates example components used by various embodiments of the present invention. Although specific components are disclosed in system 300, it should be appreciated that such components are examples. That is, embodiments of the present invention are well suited to having various other components or variations of the components recited in system 300. It is appreciated that the components in system 300 may operate with other components than those presented, and that not all of the components of system 300 may be required to achieve the goals of system 300.

FIG. 3 shows a block diagram of a system for authenticating an e-mail message, in accordance with one embodiment. Embodiments of system 300 may be executed on a computing system (e.g., system 112). Embodiments of system 300 may be carried out or be part of a mail user agent (MUA) (e.g., an e-mail client program allowing users to browse, organize, read e-mail, and the like). System 300 includes e-mail header module 302, communication module 304, and authentication module 306.

E-mail header module 302 extracts or aggregates headers from an e-mail message. For example, e-mail header module 302 may extract a "From:" header, a "Sender:" header, a "Resent:" header, a "Reply-to:" header, a "Resent-From:" header, a "Return-Path:" header, and a plurality of "Received:" headers from an e-mail message.

Communications module 304 facilitates communication of system 300 with a validation or authentication service (e.g., server 280). Communication module 304 may thus facilitate the sending of the extracted headers, including e-mail addresses and server addresses, extracted by e-mail header module 302. Communication module 302 may then receive a validation response from the validation service including registered or validated e-mail addresses, registered servers, and associated authentication instructions.

The instructions can include instructions for the e-mail program to retrieve a confidence icon relating to the sender of the e-mail (e.g., from a specified Internet location, and display it as part of the "From:" field for that e-mail). Alternatively, the e-mail program may be instructed to display a confidence icon indicating that the e-mail has been authenticated by the authentication service. The e-mail program may be instructed to display a different icon, or no icon at all if authentication was not successful. Additionally, the validation response may include additional information, such as display directives, display signs, instructions regarding the location of additional information about the sender, instructions regarding the location of additional information about a third-party, authentication failure conditions, or authentication status.

Authentication module 306 may then authenticate the e-mail message based on the validation response including the registered e-mail addresses received by communication module 304. Authentication module includes custom sender policy framework (SPF) module 308, purported responsible address (PRA) module 310, mail-from (MFROM) module 312, domainkeys (DK) module 314, and domainkeys identified mail (DKIM) module 316.

Authentication module 306 may store and access information associated with the e-mail message after an authentication process has completed. Thus, authentication module 306 may check for a previous authentication result and thereby avoid re-authenticating an e-mail message. In one embodiment, if authentication is successful (e.g., using any of custom SPF module 308, PRA module 310, MFROM module 312, DK module 314, or DKIM module 316), authentication module 306 may skip the authentication of the e-mail message by other authentication modules.

In one embodiment, authentication module 306 may compare the FROM address against and registered e-mail addresses received via communication module 304 from a validation server. If there is a match between the FROM address and the registered addresses, authentication module 306 may use custom SPF module 308 to authenticate the e-mail message. In one embodiment, custom SPF module 308 authenticates the e-mail message by performing a customized SPF authentication wherein the FROM header, being given higher priority, is used to authenticate the message prior to other headers.

It is noted that checking of the FROM address prior to checking other headers can advantageously ensure more accurate authentication. For example, where an e-mail is sent by a first company and claiming to be sent on behalf of a second company, checking the sender first may result in checking the first company's servers via SPF or Sender ID which will successfully authenticate. The problem remains where the second company did not authorize the sending of the message. By checking the "from:" header first, it can be determined whether the second company authorized the first company to send an e-mail message on behalf of second company (e.g., via an SPF record).

If the "from:" header does not match any of the registered addresses, authentication module 306, may then extract the purported responsible address (PRA) (e.g., as described in RFC 4407) and compare the PRA with the registered e-mail addresses. In another embodiment, the FROM headers may be ignored in extracting the PRA as the FROM headers have not matched a registered address. For example, the PRA may be determined from the sender, resent-from, and reply-to headers. If there is a match between the extracted PRA and the registered e-mail addresses, PRA module 310 may use the PRA to authenticate the e-mail message using the associated instruction in the validation response.

If the PRA does not match any of the registered e-mail addresses, authentication module 306 may compare the "MAIL-FROM", as defined in RFC 4408, headers with the registered e-mail addresses. If there is a match between the "MAIL-FROM" headers and the registered e-mail addresses, MFROM module 312 may then be used to authenticate the e-mail message using the associated instruction in the validation response. In one embodiment, MFROM module 312 may use SenderID (RFC 4406) and/or return path headers to authenticate the e-mail message. For example, the MUA may access the return path that is appended to the headers by SMTP edge servers.

In one embodiment, if the "MAIL-FROM" headers do not match any of the registered e-mail addresses, authentication module 306 may compare the domainkey (DK) "d=" address with the registered e-mail addresses. If there is a match between the domainkey address and the registered e-mail addresses, DK module 314 may be used to authenticate the e-mail message using the associated instruction in the validation response.

In another embodiment, if the "MAIL-FROM" headers do not match any of the registered e-mail addresses, authentication module 306 may compare the domainkeys identified mail (DKIM) "d=" and/or "i=" address with the registered e-mail addresses. If there is a match between the DKIM address and the registered e-mail addresses, DKIM module 316 may be used to authenticate the e-mail message using the associated instruction in the validation response.

If there is no match between the domainkeys addresses and/or the DKIM address, authentication module 306 may report that the e-mail can not be authenticated. The result of the authentication success/fail may then be stored by authentication module 306. It is appreciated that the authentication may have failed for reasons such as a failure of authentication requests (e.g., DNS response) due to a time out.

Authentication module 306 may use communication module 304 to report the success or failure of authentication of the e-mail message to the validation server. Validation server may then store the results to of the authentication for viewing by a registered sender. Registered senders will then be able to see why message authentication is failing (e.g., incomplete SPF records, spoofed headers, phishing attempts, and the like).

The results of authentication module 306 may be used to confidence mark the e-mail. The confidence mark may include icons, characters, or other visual indicators that a user may rely on the contents of the e-mail. It is appreciated that embodiments of the present invention may confidence mark only positive or successfully authenticated e-mails.

With reference to FIGS. 4-7, flowcharts 400, 410, 600, and 700 illustrate example functions used by various embodiments of the present invention for calibrating an integrated circuit. Flowcharts 400, 410, 600, and 700 include processes that, in various embodiments, are carried out during the manufacture of an integrated circuit and the individual steps may be computer controlled. Although specific function blocks ("blocks") are disclosed in flowcharts 400, 410, 600, and 700, such steps are examples. That is, embodiments are well suited to performing various other blocks or variations of the blocks recited in flowcharts 400, 410, 600, and 700. It is appreciated that the blocks in flowcharts 400, 410, 600, and 700 may be performed in an order different than presented, and that not all of the blocks in flowcharts 400, 410, 600, and 700 may be performed.

Figure 4:
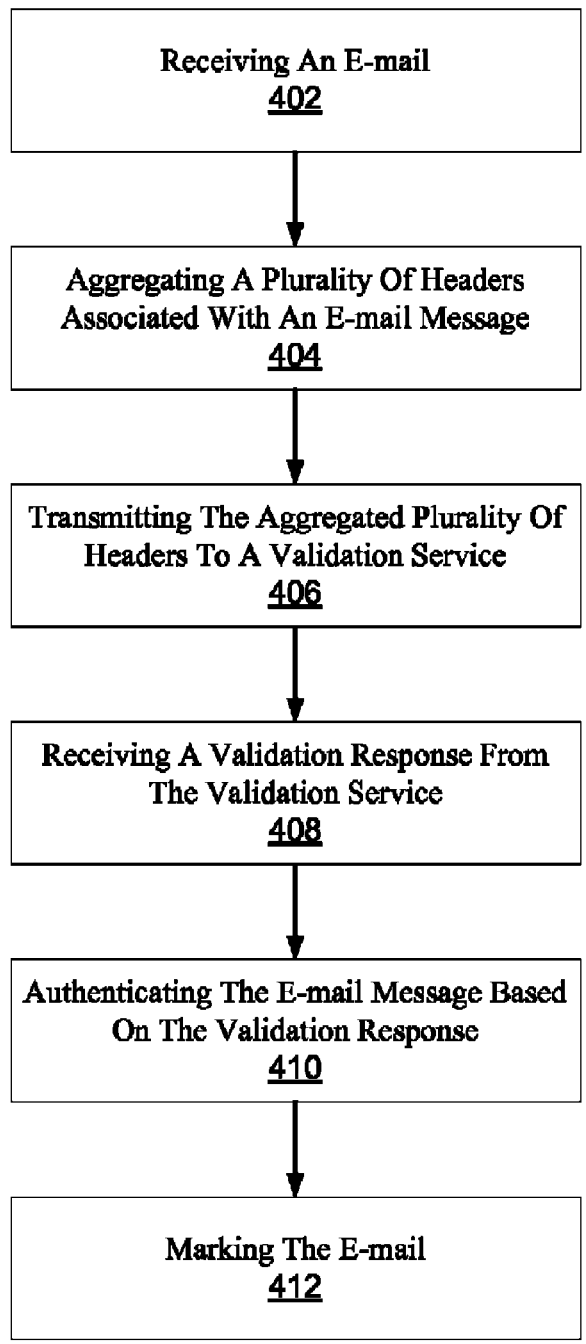
FIG. 4 is a flowchart of a method of e-mail authentication, in accordance with one embodiment.

FIG. 4 shows a flowchart of a method of e-mail authentication, in accordance with one embodiment. The blocks of flowchart 400 may be carried out by a mail user agent (MUA) (e.g., an e-mail client).

At block 402, an e-mail is received. As described herein, the e-mail may be received via a MUA including, but not limited to, an e-mail client program or web-based e-mail service.

At block 404, a plurality of e-mail headers associated with the e-mail message are aggregated. The plurality of headers can include a "From:" header, a "Sender:" header, a "Resent:" header, a "Reply-to:" header, a "Resent-From:" header, a "Return-Path:" header, and a plurality of "Received:" headers. It is appreciated that embodiments of the present may aggregate additional headers as well. In one embodiment, the aggregation process further includes removing duplicate e-mail addresses.

At block 406, the aggregated plurality of headers is transmitted to a validation service. In one embodiment, the validation service may reside on a server (e.g., server 280). The validation service can filter out unregistered e-mail addresses which are invalid (e.g., misspelled e-mail addresses such as customerswervice@bank.com and fraudulent senders such as Your0nlinebank.com (with the number "0")).

At block 408, a validation response is received from the validation service. As described herein, the validation response may include registered e-mail addresses which are registered as authorized senders with the validation service and associated authentication instructions.

At block 410, the e-mail message is authenticated based on the validation response.

Figure 5:
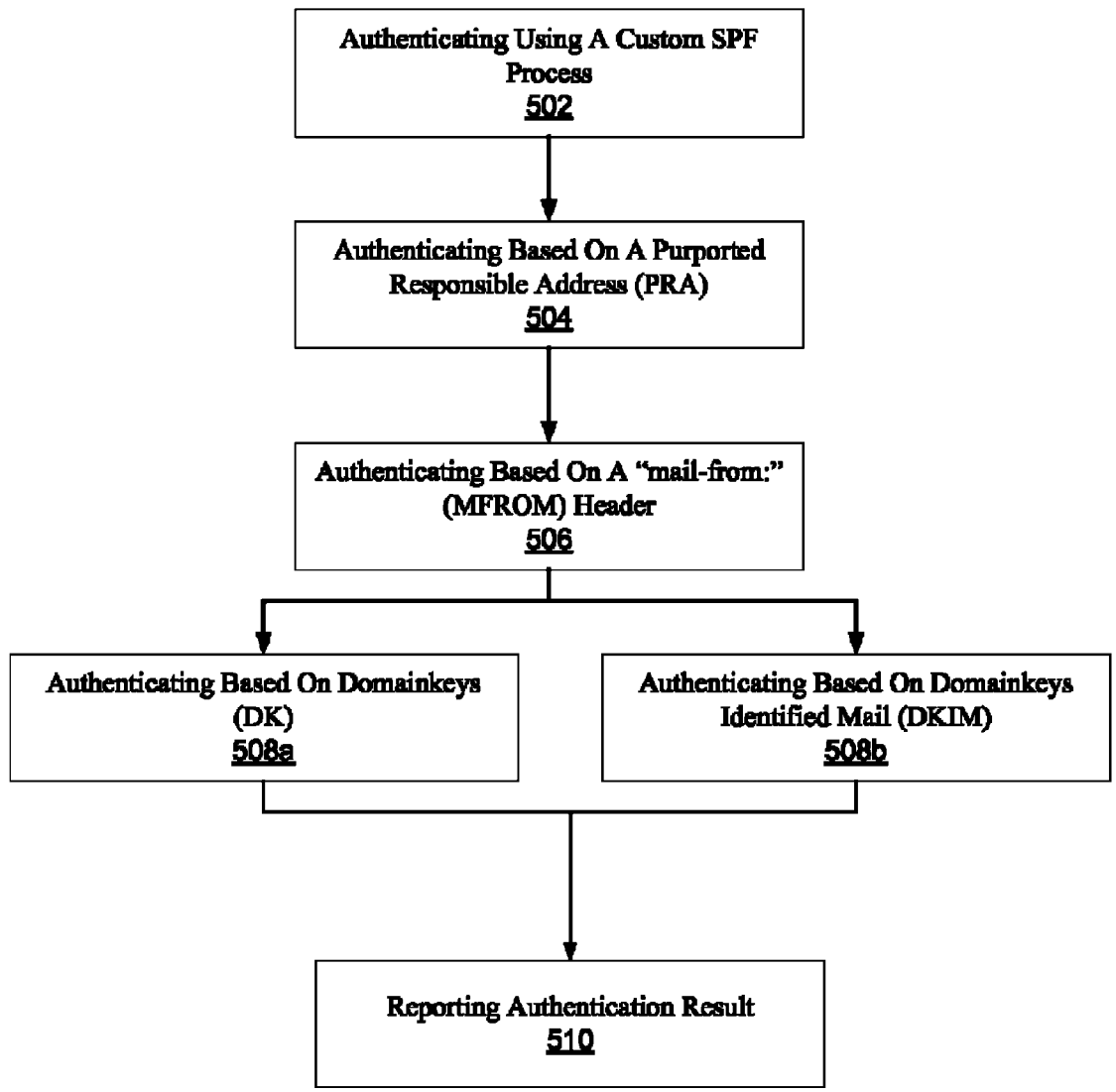
FIG. 5 is a flowchart of a method of authenticating an e-mail, in accordance with one embodiment.

Referring now to FIG. 5, a flowchart 410 of a method of authenticating an e-mail is shown, in accordance with one embodiment. As described herein, the authentication may be performed by a MUA. In one embodiment, as soon as the e-mail message is successfully authenticated, the successful authentication may be reported without performing additional authentication blocks of flowchart 410.

At block 502, the e-mail message is authenticated using a custom SPF process if a "From: header" matches an address within the validation response. As described herein, the custom SPF authentication may attempt to authenticate the e-mail message based on the "from:" header prior to other e-mail headers.

At block 504, the e-mail message is authenticated based on a purported responsible address (PRA), where there is a mismatch between the "From: header" and each address within the validation response.

At block 506, the e-mail message based on a "MAIL-FROM" header, where there is a mismatch between a PRA and each address within the validation response. As described herein, senderID or return path may be use to authenticate the e-mail message.

At block 508a, the e-mail message is authenticated based on domainkeys, where there is a mismatch between each "MAIL-FROM header" and each address within the validation response.

At block 508b, the e-mail message is authenticated based on domainkeys identified mail, where there is a mismatch between each "MAIL-FROM header" and each address within the validation response.

At block 510, the authentication result is reported. As described herein, if there is no match of any of the e-mail addresses in the headers and the e-mail addresses in the validation response the authentication result may be reported to have failed.

Referring back to FIG. 4, at block 412, the e-mail is marked. The e-mail may be marked with a confidence mark indicating that the e-mail has been successfully authenticated. The confidence mark may be a character or icon and displayed on graphical user interface in a position associated with the e-mail (e.g., in the "From:" line or field). Placing a cursor or mousing over the confidence marker may display information associated with the basis for authenticating the e-mail. For example, mousing over a confidence mark an e-mail with a display from of user@world.org which was sent by service@bank.com may display that the message was sent by service@bank.com which is an authorized or registered sender. In one embodiment, e-mail messages may only be marked when authentication was successful. It is appreciated that an e-mail can be marked as bad based on not being able to be authenticated or authentication failing.

Figure 6:
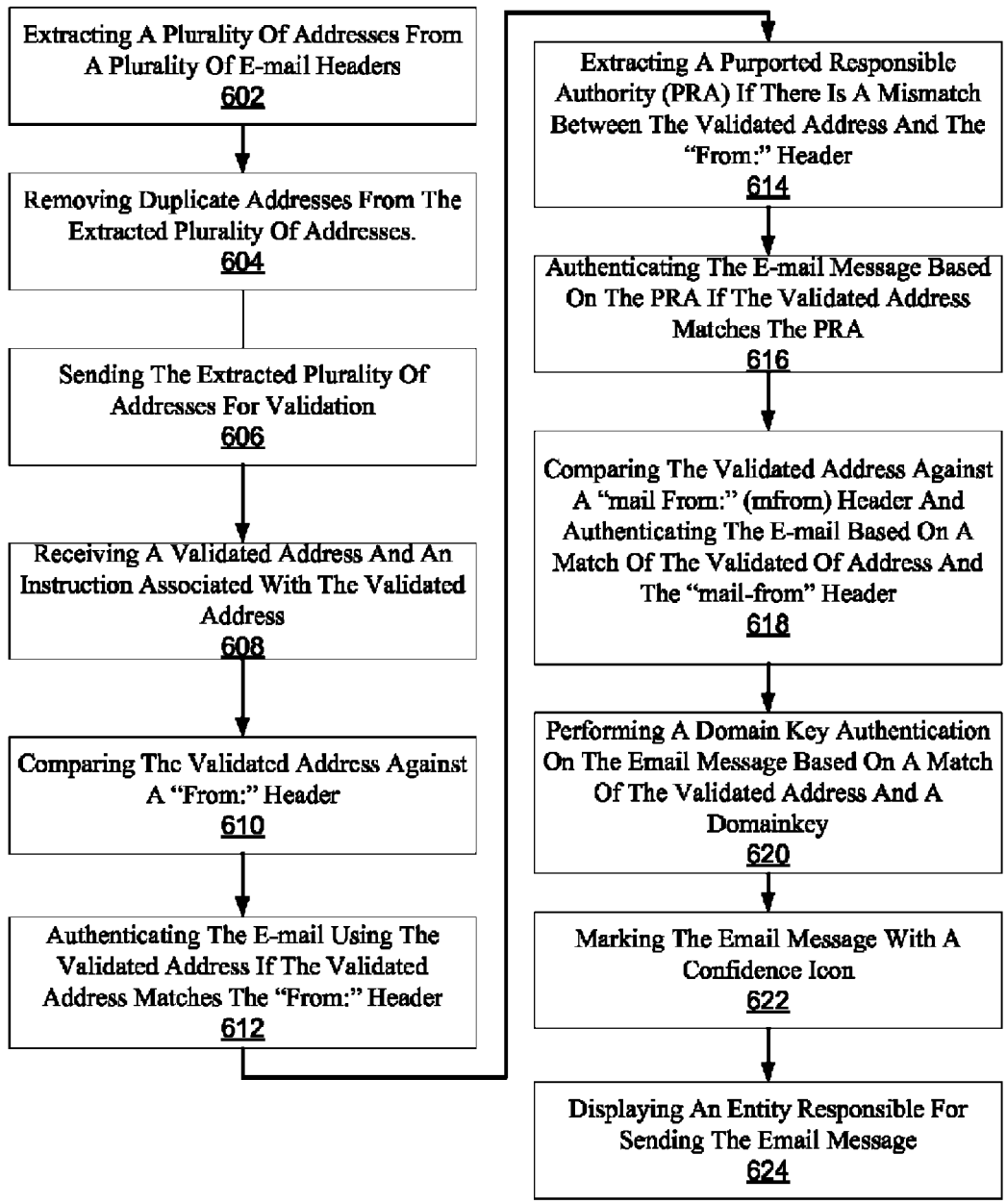
FIG. 6 is a flowchart of a method of authenticating an e-mail, in accordance with one embodiment.

FIG. 6 shows a flowchart of a method of authenticating an e-mail, in accordance with one embodiment. As described herein, the blocks of flowchart 600 may be performed by a MUA.

At block 602, a plurality of addresses is extracted from a plurality of e-mail headers associated with the e-mail message. The plurality of e-mail headers include a "From:" header, a "Sender:" header, a "Resent:" header, a "Reply-to:" header, a "Resent-From:" header, a "Resent-Sender:" header, a "Return-Path:" header, and a plurality of "Received:" headers.

At block 604, duplicate addresses are removed from the extracted plurality of addresses. For example, the "From:" header and the "Sender:" header may be the same and will only need to validated once, so only a single address needs to be sent to the validation service.

At block 606, the extracted plurality of addresses are sent for validation. As described herein, the plurality of addresses may be sent to a validation service (e.g., server 280).

At block 608, a validated address is received along with instructions associated with the validated address.

At block 610, the validated address is compared against a "From:" header.

At block 612, the e-mail is authenticated using the validated address if the validated address matches the "From:" header. As described herein, a custom SPF process may be used to validate the e-mail.

At block 614, a purported responsible authority (PRA) is extracted if there is a mismatch between the validated address and the "From:" header. As described herein, in one embodiment, the "from:" header may be ignored in determining the PRA as the address was already determined not to be a registered sender.

At block 616, the e-mail message is authenticated based on the PRA if the validated address matches the PRA.

At block 618, the validate address is compared against a "MAIL-FROM" (MFROM) header and the e-mail based is authenticated based on a match of the validated address and the "mail-from" header.

At block 620, a domainkey or domainkey identified mail authentication is performed on the e-mail message based on a match of the validated address and a domainkey or DKIM.

At block 622, the e-mail message is marked with a confidence icon. As described herein, the confidence mark may be any icon to indicate that authentication was successful or failed. Further, the confidence icon may be specific to the authorized sender.

At block 624, an entity responsible for sending the e-mail message is displayed. As described herein, the entity responsible may be displayed when the user mouses over the confidence icon.

Figure 7:
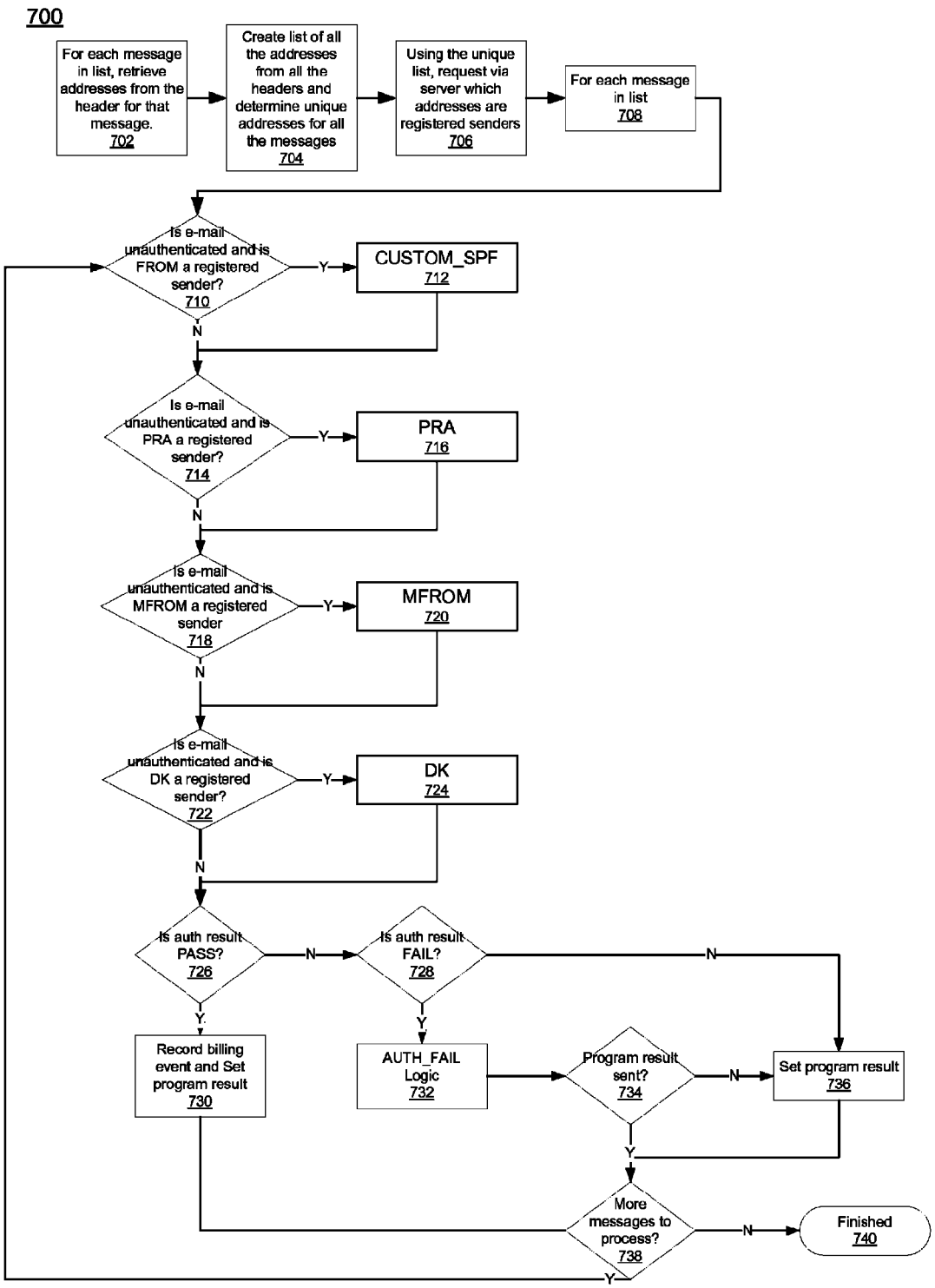
FIG. 7 is a flowchart of a method of authenticating a plurality of e-mail messages, in accordance with one embodiment.

FIG. 7 shows a flowchart of a method of authenticating a plurality of messages, in accordance with one embodiment. The blocks of flowchart 700 may be carried out by a mail user agent (MUA) (e.g., mail client software).

At block 702, for each message in the list of messages, addresses are retrieved from the header of that message. As described herein, the FROM, PRA, MFROM, and DK domain or DKIM domain may be retrieved.

At block 704, a list is created from all the headers and a determination of the unique addresses for all the messages is made. As described herein, duplicate addresses may be removed from the list of headers.

At block 706, a request is made to a validation server of which addresses in the unique list are registered senders. As described herein, the request may be made to a validation server (e.g., server 280).

At block 708, for each message in the messages list an authentication process (e.g. block 710-738) is performed.

At block 710, a determination of whether the e-mail is unauthenticated and the FROM is a registered sender is made. If the message is authenticated, block 738 is performed and the authentication process moves to the next message in the message list. If the message is unauthenticated and the FROM address is a registered sender, block 712 is performed and a custom SPF process is used to authenticate the message. As described herein, the custom SPF process may authenticate the e-mail message based on the "From:" header or address prior to checking other addresses.

At block 714, a determination of whether the e-mail is unauthenticated and the PRA is a registered sender is made. If the message is authenticated, block 718 is performed. If the message is unauthenticated and the PRA is a registered sender, block 716 is performed and the PRA is used to authenticate the e-mail message.

At block 718, a determination of whether the e-mail is unauthenticated and the MFROM is a registered sender is made. If the message is authenticated, block 722 is performed. If the message is unauthenticated and the MFROM address is a registered sender, block 720 is performed and the MFROM is used to authenticate the message. As described herein, the MFROM may be authenticated based on SenderID or the return path headers.

At block 722, a determination of whether the e-mail is unauthenticated and the DK is a registered sender is made. If the message is authenticated, block 726 is performed. If the message is unauthenticated and the domainkeys (DK) is a registered sender, block 724 is performed and domainkeys is used to authenticate the e-mail message. It is appreciated that that DKIM may be used in place of domainkeys authenticate the e-mail message.

At block 726, the authentication result is checked to see if authentication was successful. If the authentication was successful, block 730 is performed and a billing event is recorded and the program result is set. After block 730 has been performed, block 738 is performed.

If the authentication was not successful, block 728 is performed and a check is made as to whether the authentication failed. If the authentication result is not failure, block 736 is performed. If the authentication failed, block 732 is performed and authentication failure logic is executed. Authentication failure logic can include marking a message with an icon indicating authentication has failed (e.g., a stop sign, red circle with a slash, and the like) and recording the failure along with the associated details of why authentication failed.

At block 734, a program result is checked to see if it has been sent. If the program result has not been sent, block 736 is performed and program result is set. The program result may include a message or signal to the e-mail client which indicates whether authentication was successful or not and what confidence markings should be displayed. In one embodiment, information may be returned back the validation server. The data may then be shared with senders which allows the senders to see why authentication failed. For example, an e-mail message may not authenticate because a server was not added to an SPF record so every e-mail from that particular server fails authentication. The information sent back to the server can also include the sending IP address, or Originating IP address, of the e-mail message. After the program result is set or the program result has been sent, block 738 is performed and a check is made if there are more messages to process. If there are no more messages to process block 740 is executed and the authentication of the plurality of e-mail messages is finished.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of authenticating an e-mail message, comprising:
   aggregating a plurality of headers associated with an e-mail message;
   transmitting said aggregated plurality of headers to a validation service;
   receiving a validation response from said validation service, wherein said validation response comprises a validated address;
   authenticating said e-mail message based on said validated address where said validated address matches a "From:" header;
   authenticating said e-mail message based on a purported responsible address (PRA) where there is a mismatch between said "From: header" and each address within said validation response; and
   authenticating said e-mail message based on a "MAIL-FROM" header where there is a mismatch between a PRA and each address within said validation response.

2. The method of claim 1 wherein said plurality of headers, comprises:
   a "From:" header;
   a "Sender:" header;
   a "Resent:" header;
   a "Reply-to:" header;
   a "Resent-From:" header;
   a "Return-Path:" header; and
   a plurality of "Received:" headers.

3. The method of claim 1 further comprising:
   authenticating said e-mail message using a custom SPF process where a "From: header" matches an address within said validation response.

4. The method of claim 1 further comprising:
   authenticating said e-mail message based on domainkeys where there is a mismatch between each "MAIL-FROM header" and each address within said validation response.

5. The method of claim 1 further comprising:
   authenticating said e-mail message based on domainkeys identified mail where there is a mismatch between each "MAIL-FROM" header and each address within said validation response.

6. A system for authenticating an e-mail message comprising:
   a processor;
   an article of manufacture including a computer-readable medium having instructions stored thereon comprising:
      an e-mail header module for extracting headers from an e-mail message;
      a communications module for sending said e-mail headers extracted by the e-mail header module and for receiving a validation response comprising one or more e-mail addresses and corresponding instructions;
      an authentication module for authenticating said e-mail message based on said validation response, wherein said authentication module is operable to compare a validated address of said validation response with a "From:" header, and wherein said authentication module is operable to authenticate said e-mail message based on a purported responsible address (PRA) where said validated address matches said PRA and said authentication module is operable to authenticate said e-mail message based on a match of said validated address and a "MAIL-FROM" header.

7. The system of claim 6 wherein said authentication module further comprises a purported responsible address module for determining a purported responsible address (PRA).

8. The system of claim 6 wherein said authentication module further comprises a mail-from module for authenticating the e-mail message based on "MAIL-FROM" headers.

9. The system of claim 6 wherein said authentication module further comprises a domainkeys module for authenticating said e-mail message based on domainkeys (DK).

10. The system of claim 6 wherein said authentication module further comprises a domainkeys identified mail module for authenticating said e-mail message based on domainkeys identified mail (DKIM).

11. A method of authenticating an e-mail message, comprising:
 extracting a plurality of addresses from a plurality of e-mail headers associated with said e-mail message;
 sending said extracted plurality of addresses for validation;
 receiving a validated address and an instruction associated with said validated address;
 comparing said validated address against a "From:" header;
 authenticating said e-mail message using said validated address where said validated address matches said "From:" header;
 extracting a purported responsible authority (PRA) where there is a mismatch between said validated address and said "From:" header;
 authenticating said e-mail message based on said PRA where said validated address matches said PRA; and
 comparing said validated address against a "MAIL-FROM" (MFROM) header and authenticating said e-mail message based on a match of said validated address and said "mail-from" header.

12. The method of claim 11, further comprising:
 authenticating said e-mail message based on said PRA if said validated address matches said PRA.

13. The method of claim 11, further comprising:
 performing a domainkey authentication on said e-mail message based on a match of said validated address and a domainkey.

14. The method of claim 11, wherein said plurality of e-mail headers comprises:
 a "From:" header; and
 a "Sender:" header;
 a "Resent:" header;
 a "Reply-to:" header;
 a "Resent-From:" header;
 a "Resent-Sender:" header;
 a "Return-Path:" header; and
 a plurality of "Received:" headers.

15. The method of claim 11, further comprising:
 removing duplicate addresses from said extracted plurality of addresses.

16. The method of claim 11, further comprising:
 marking said e-mail message with a confidence icon.

17. The method of claim 11, further comprising:
 displaying an entity responsible for sending said e-mail message.

18. The method of claim 11, further comprising:
 displaying information comprising the basis for authentication.

* * * * *